United States Patent
Bashandy et al.

(10) Patent No.: US 9,036,463 B2
(45) Date of Patent: May 19, 2015

(54) SCALABLE BGP PROTECTION FROM EDGE NODE FAILURE USING DYNAMICALLY ASSIGNED LABELS IN DATA PACKETS

(71) Applicant: Cisco Technology, Inc., San Jose, CA (US)

(72) Inventors: Ahmed R Bashandy, Milpitas, CA (US); Clarence Filsfils, Brussels (BE); Eric C. Rosen, Arlington, MA (US)

(73) Assignee: Cisco Technology, Inc., San Jose, CA (US)

(*) Notice: Subject to any disclaimer, the term of this patent is extended or adjusted under 35 U.S.C. 154(b) by 137 days.

(21) Appl. No.: 13/935,639

(22) Filed: Jul. 5, 2013

(65) Prior Publication Data

US 2015/0009803 A1 Jan. 8, 2015

(51) Int. Cl.
*H04L 12/24* (2006.01)
*H04L 12/707* (2013.01)

(52) U.S. Cl.
CPC .......... *H04L 41/0668* (2013.01); *H04L 45/22* (2013.01)

(58) Field of Classification Search
USPC ....................................... 370/219
See application file for complete search history.

(56) References Cited

U.S. PATENT DOCUMENTS

| | | | | |
|---|---|---|---|---|
| 8,750,095 B2* | 6/2014 | Bashandy | | 370/218 |
| 2006/0126496 A1* | 6/2006 | Filsfils et al. | | 370/216 |
| 2007/0036072 A1* | 2/2007 | Raj et al. | | 370/225 |
| 2007/0076706 A1* | 4/2007 | Shirizly | | 370/389 |
| 2009/0154346 A1* | 6/2009 | Sun | | 370/228 |
| 2012/0092986 A1* | 4/2012 | Chen | | 370/228 |
| 2013/0343174 A1* | 12/2013 | Guichard et al. | | 370/218 |
| 2013/0343176 A1* | 12/2013 | Bashandy | | 370/219 |
| 2014/0078927 A1* | 3/2014 | Thubert et al. | | 370/254 |
| 2014/0269261 A1* | 9/2014 | D'Souza et al. | | 370/225 |
| 2014/0334286 A1* | 11/2014 | Ernstrom et al. | | 370/216 |

OTHER PUBLICATIONS

Filsfils et al., "LFA applicability in SP networks", [online], Mar. 1, 2010, [retrieved on Aug. 29, 2011]. Network Working Group, Internet Draft, <draft-filsfils-rtgwg-lfa-applicability-00>. Retrieved from the Internet: <URL: http://tools.ietf.org/html/draft-filsfils-rtgwg-lfa-applicability-00>, pp. 1-28.

(Continued)

*Primary Examiner* — Melvin Marcelo
*Assistant Examiner* — Peter Solinsky
(74) *Attorney, Agent, or Firm* — Leon R. Turkevich (57) ABSTRACT

In one embodiment, a method comprises detecting, by a provider edge router configured for providing reachability for core network traffic to a prescribed destination address prefix, a backup provider edge router relative to the prescribed destination address prefix; allocating, by the provider edge router, a distinct protected next-hop address for reachability to at least the destination address prefix via the provider edge router; and sending via a core network, by the provider edge router, repair information for the prescribed destination address prefix to ingress provider edge routers and a BGP-free core network router in the core network, the repair information enabling the ingress provider edge routers to insert primary and backup switching labels into each data packet of the core network traffic enabling the BGP-free core network router to reroute the received packet to the backup provider edge router if the provider edge router is unavailable.

20 Claims, 6 Drawing Sheets

(56) References Cited

OTHER PUBLICATIONS

Jeganathan et al., "2547 egress PE Fast Failure Protection", [online], Oct. 25, 2011, [retrieved on Jun. 12, 2013]. Network Working Group, Internet Draft, <draft-minto-2547-egress-node-fast-protection-000>, Retrieved from the Internet: <URL: http://tools.ietf.org/pdf/draft-minto-2547-egress-node-fast-protection-00.pdf>, pp. 1-13.

MPLS-Tag DocWiki, "MPLS/Tag Switching", [online], Oct. 15, 2010, [retrieved on Jul. 13, 2012]. Retrieved from the Internet: <URL: http://docwiki.cisco.com/wiki/MPLS/Tag_Switching>, pp. 1-10.

Rosen et al., "Multiprotocol Label Switching Architecture", Network Working Group, Request for Comments: 3031, Jan. 2001, pp. 1-61.

Andersson et al., "LDP Specification", Network Working Group, Request for Comments: 3036, Jan. 2001, pp. 1-132.

Andersson et al., "LDP Specification", Network Working Group, Request for Comments: 5036, Oct. 2007, pp. 1-135.

Atlas et al., "Basic Specification for IP Fast Reroute: Loop-Free Alternates", Network Working Group, Request for Comments: 5286, Sep. 2008, pp. 1-31.

Bashandy et al., "BGP FRR Protection against Edge Node Failure Using Vector Labels", Jul. 7, 2012, Network Working Group, Internet Draft, <draft-bashandy-bgp-frr-vector-label-00.txt>, pp. 1-32.

* cited by examiner

SCALABLE BGP PROTECTION FROM EDGE NODE FAILURE USING DYNAMICALLY ASSIGNED LABELS IN DATA PACKETS

TECHNICAL FIELD

The present disclosure generally relates to recovery from failure of edge routers that utilize border gateway protocol (BGP) for tunneling data traffic across a BGP-free core network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wide area networks are composed of edge routers that provide connections for a multi-homed network to a destination network via a core network, also referred to as a backbone network. Since the core network must be composed of core routers that must be able to perform the fastest possible switching operations for extremely large amounts of data traffic, the core routers often are implemented using BGP-free core routers: unlike edge routers that utilize BGP for tunneling data traffic across a core network to destination networks, BGP-free core routers do not employ BGP protocol and therefore do not need to learn about the millions of Internet protocol (IP) address prefixes that may be utilized by the edge routers.

However, if an edge router encounters a failure, there is a need to restore traffic within a guaranteed fifty (50) millisecond interval by retunnelling packets to another edge router that advertised the destination IP address prefix, without the necessity of BGP reconvergence by the edge routers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises detecting, by a provider edge router configured for providing reachability for core network traffic to a prescribed destination address prefix, a backup provider edge router relative to the prescribed destination address prefix; allocating, by the provider edge router, a distinct protected next-hop address for reachability to at least the destination address prefix via the provider edge router; and sending via a core network, by the provider edge router, repair information for the prescribed destination address prefix to at least one ingress provider edge router and a Border Gateway Protocol (BGP) free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

In another embodiment, logic is encoded in one or more non-transitory tangible media for execution by a machine, and when executed is operable for: detecting, by the machine implemented as a provider edge router and configured for providing reachability for core network traffic to a prescribed destination address prefix, a backup provider edge router relative to the prescribed destination address prefix; allocating, by the provider edge router, a distinct protected next-hop address for reachability to at least the destination address prefix via the provider edge router; and sending via a core network, by the provider edge router, repair information for the prescribed destination address prefix to at least one ingress provider edge router and a Border Gateway Protocol (BGP)-free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

In another embodiment, an apparatus comprises a network interface circuit and a processor circuit. The network interface circuit is configured for detecting a backup provider edge router, the apparatus implemented as a provider edge router configured for providing reachability for core network traffic to a prescribed destination address prefix, the backup provider edge router relative to the prescribed destination address prefix. The processor circuit is configured for allocating a distinct protected next-hop address for reachability to at least the destination address prefix via the provider edge router. The processor circuit also is configured for generating, for transmission, via a core network, repair information for the prescribed destination address prefix to at least one ingress provider edge router and a Border Gateway Protocol (BGP)-free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

DETAILED DESCRIPTION

Particular embodiments enable a core router in a BGP-free core network to serve as a repairing core router (rP) providing connectivity between provider edge routers (PEs) that utilize BGP to tunnel traffic across the BGP-free core network.

Figure 1:
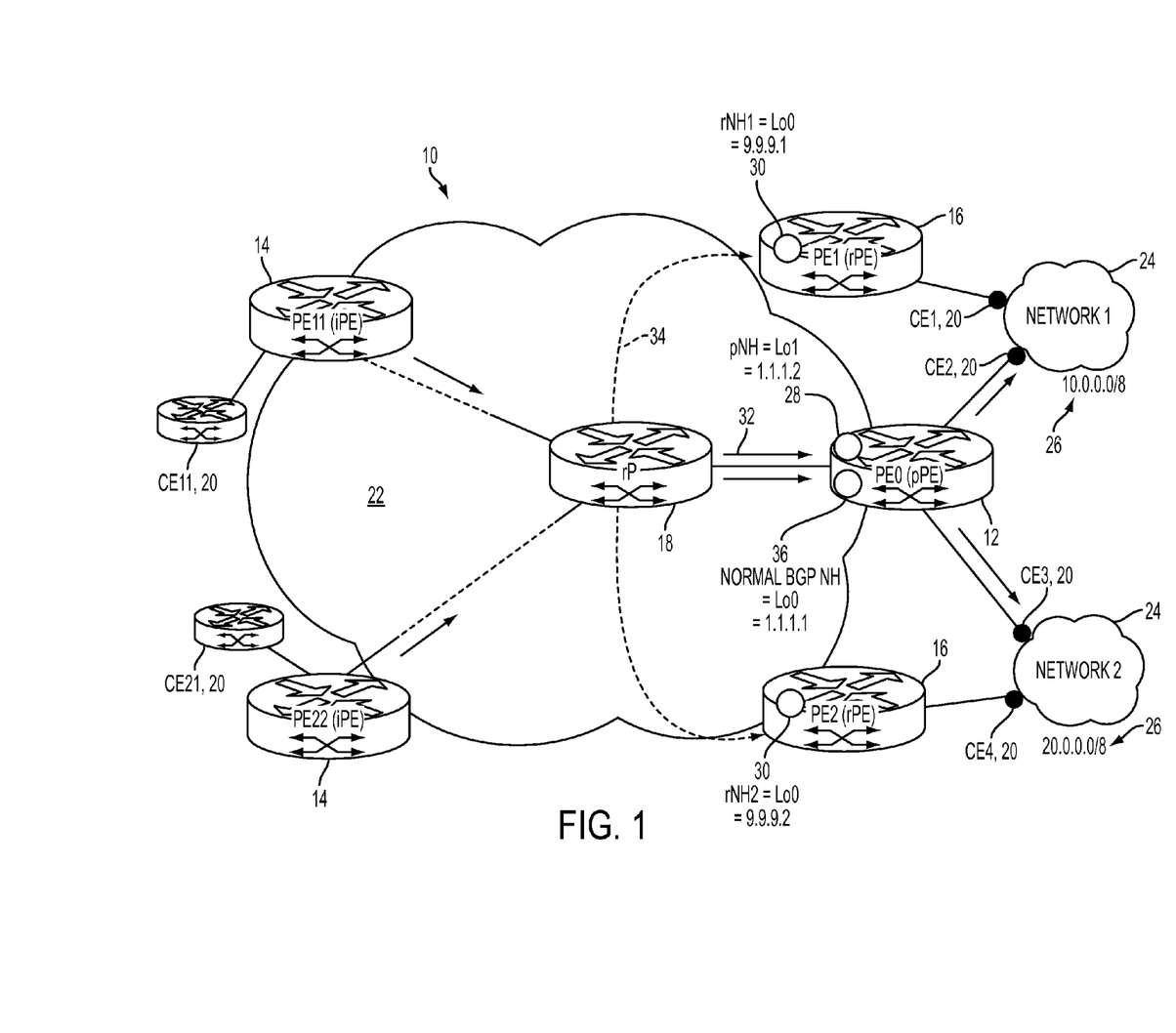
FIG. 1 illustrates an example system having an apparatus for sending repair information to edge routers via a core network and a BGP-free core router to enable edge router insertion of primary and backup switching labels into each data packet for rerouting of data packets by the BGP-free core router, according to an example embodiment.

FIG. 1 is a diagram illustrating an example network 10 having one or more protected Provider Edge (pPE) routers 12, one or more ingress Provider Edge (iPE) routers 14, one or more repair Provider Edge (rPE) routers 16, and one or more BGP-free core network routers 18 serving as repair routers (rP), according to an example embodiment. The repair Provider Edge (rPE) routers 16 also are referred to herein as "backup provider edge routers" to reduce confusion with the repair routers (rP) 18. The BGP-free core network router 18 serves as a repairing core router that reroutes data traffic to a backup provider edge (rPE) router 16 if a protected Provider Edge (pPE) router 12 is unavailable. The BGP-free core network router 18 is part of a BGP-free core network 22 that does not utilize BGP protocol, but serves as a "backbone" network for edge routers 12, 14, and 16 that tunnel traffic to each other using the core network 22.

The provider edge routers 12, 14, and 16 serve as next-hop routers into and out of the core network 22 for customer edge (CE) routers 20: each customer edge (CE) router 20 can be positioned at the edge an associated external network 24 having one or more globally-distinct IPv4 and/or IPv6 address prefixes 26. Each external network 24 is a distinct Autonomous System (AS).

Hence, ingress provider edge (iPE) routers 14 can tunnel data traffic via the core network 22 based on inserting ("pushing") context-sensitive labels into each data packet, implemented for example as Label Distribution Protocol (LDP) labels based on multiprotocol label switching (MPLS). The egress provider edge routers 12, 16 can output context-sensitive labels for reaching destination address prefixes 26 according to BGP. For example, the repair PE router (rPE) (e.g., PE1, PE2) 16 can allocate a repair label (rL) and (optionally) advertise the repair label (rL) with protected prefixes 26. The protected Provider Edge (pPE) router 12 can advertise repair information for an identified destination (e.g., address prefixes 26) to the ingress Provider Edge routers (iPE) (e.g., PE11 and/or PE22) 14 and to the repairing core router (rP) 18, enabling the ingress Provider Edge routers (iPE) 14 to push both primary labels and repair labels within each data packet to ensure reachability to the destination network 24 via the repair PE router (rPE) 16 in the event that the protected Provider Edge (pPE) router 12 is not available.

Hence, the repairing core router (rP) 18 can provide instantaneous rerouting to the repair PE router (rPE) 16 for a destination address prefix 26 in response to the repairing core router 18 detecting that the protected Provider Edge (pPE) router 12 is unavailable, where the repairing core router (rP) 18 can instantaneously reroute a data packet to the repair PE router (e.g., PE1) 16 based on manipulating switching labels within the received data packet using the repair information advertised by the protected Provider Edge (pPE) router 12. Consequently, the data packet can be rerouted before BGP reconvergence among the edge routers, without the risk of the rerouted data packet encountering loops. In one embodiment, the repairing core router (rP) 18 can utilize a context-sensitive vector label (vL) generated by the protected Provider Edge (pPE) router 12 and stored in the data packet: the context-sensitive vector label (vL) enables the repairing core router (rP) 18 to access a locally-accessible table to retrieve a repair label associated with the vector label for rerouting the data packet to the repair PE router 16. In another embodiment, the protected Provider Edge (pPE) router 12 can allocate a single protected next hop address (pNH) 28 for each Protected-Repair PE Pair (i.e., an identified pairing of the protected Provider Edge (pPE) router and the repair PE router (rPE)) and advertise an association between a repair next-hop address (rNH) 30 used by the repair PE router 16 for reaching the destination address prefix 26, and the protected next-hop address (pNH) 28 used by the protected PE (pPE) 12 for reaching the destination address prefix.

Hence, the example embodiments enable a protected Provider Edge (pPE) router 12 to send repair information, associating the protected Provider Edge (pPE) router 12 with an identified repair PE router (rPE) 16, to the ingress PE routers 14 and the repair router (rP) 18 in the core network 22, enabling the repair router (rP) 18 to execute instantaneous switching in the core network 22 to the repair PE router (rPE) 16 based on a detected unavailability of the protected Provider Edge (pPE) router 12.

Hence, the example embodiments ensure that no router needs to copy prefixes from another router, such that only the edge router needs to store its own label for reaching the next-hop destination network, i.e., only the protected Provider Edge (pPE) router 12 and the repair PE router 16 need to store their own labels for reaching the next-hop destination network 24. Further, the BGP-free core network router 18 is not required to learn any BGP prefix, nor is the BGP-free core network router 18 required to undergo any complicated provisioning efforts; hence, the size of the forwarding and routing tables in any core router 18 is independent of the number of BGP prefixes in use by the edge routers 12, 14, 16.

Further, the choice of a primary path 32 or a backup path 34 via the core network is chosen solely by the ingress Provider Edge (iPE) router 14 according to its internal policies, and is therefore independent of the advertisements by the other routers 12 or 16. Further, the example embodiments ensure that the backup path 34 is encoded in each data packet, enabling the BGP-free core network router (rP) to independently reroute the received data packet to the repairing PE router (rPE) if the protected PE router (pPE) is unavailable. Further, the example embodiments can be implemented as an improvement in existing networks without disruption, as the repair information and the primary and backup switching labels described herein can be advertised as "optional attributes" that can be disregarded by existing routers that cannot implement the example embodiments; in such cases, edge routers can reach a destination address prefix (e.g., "10.0.0.0/8") via a conventional BGP next hop address "1.1.1.1" 36 also advertised by the protected PE router (pPE) 12.

Each of the routers 12, 14, 16, 18, and 20 can be referred to also as "apparatus". In particular, each router (apparatus) 12, 14, 16, 18 and 20 is a physical machine (i.e., a hardware device) configured for implementing network communications with other physical machines (e.g., customer edge (CE) routers 20) via the network 10. Hence, each apparatus 12, 14, 16, 18, and 20 is a network-enabled machine implementing network communications via the network 10.

Figure 2:
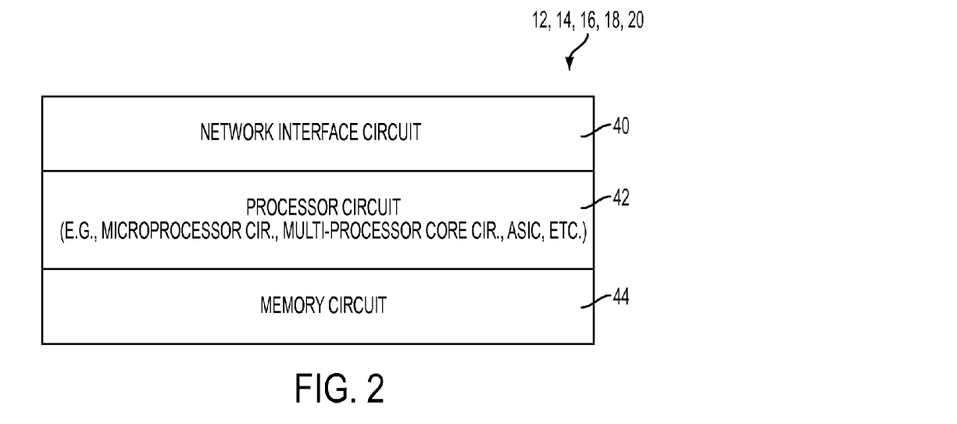
FIG. 2 illustrates an example implementation of any one of the routers of FIG. 1, according to an example embodiment.

FIG. 2 illustrates an example implementation of any one of the routers 12, 14, 16, 18, or of FIG. 1, according to an example embodiment. Each of the routers 12, 14, 16, 18, or 20 can include one or more network interface circuits 40, one or more processor circuits 42, and one or more memory circuits 44.

Any of the disclosed circuits of the routers 12, 14, 16, 18, or 20 (including the network interface circuit 40, the processor circuit 42, and the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
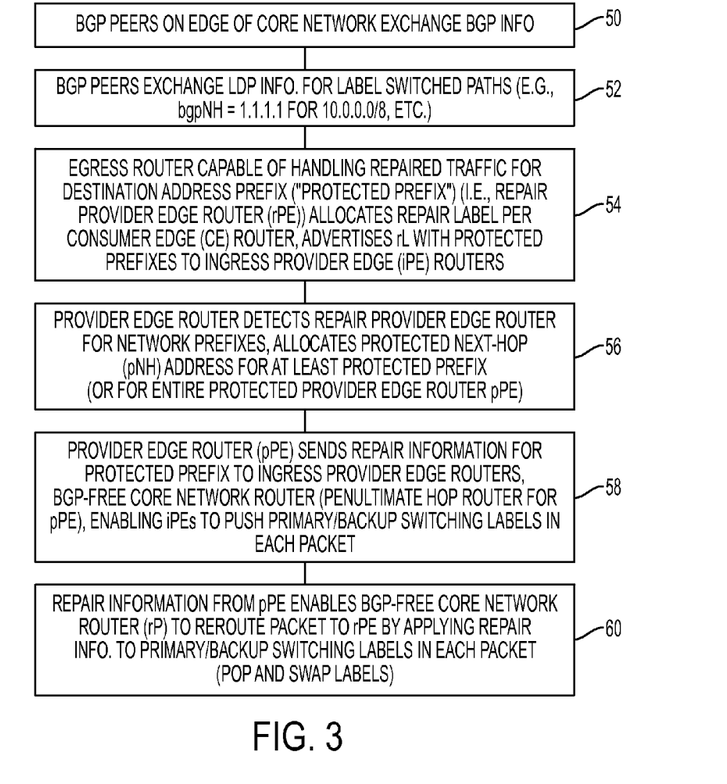
FIG. 3 summarizes a method of an apparatus sending repair information to enable edge router insertion of primary and backup switching labels into each data packet for rerouting by the BGP-free core router, according to an example embodiment.

FIG. 3 summarizes a method of an apparatus sending repair information to enable edge router insertion of primary and backup switching labels into each data packet for rerouting by the BGP-free core router, according to an example embodiment. The operations described herein with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

FIG. 3 summarizes the operations that enable the BGP-free core network router 18, also referred to as the repairing core router (rP) 18, to reroute a received data packet to a backup provider edge (rPE) router 16 via a backup path 34 if the protected Provider Edge (pPE) router 12 is unavailable via the primary path 32.

The edge routers 12, 14, and 16 initially can exchange Internet Protocol (IP) address prefix information for destination address prefixes 26 of destination networks 24 according to BGP protocol in operation 50. As noted previously, no core router 18 utilizes BGP protocol; hence no address prefix information is stored in any core router 18. The edge routers 12, 14, and 16 in operation 52 also can initially exchange label distribution protocol (LDP) labels.

In operation 54 a provider edge router (e.g., PE1) can determine that it is capable of handling repaired traffic for a destination address prefix (e.g., "10.0.0.0/8") 26, and in response allocate a repair label (rL) as an index into its local label table identifying that the destination address prefix is reachable via a next-hop consumer edge router (e.g., CE1 20). The provider edge router (e.g., PE1) can advertise itself in operation 54 as an available repair Provider Edge (rPE) router (i.e., "backup provider edge router") 16 based on specifying the repair label (rL) with the protected prefix(es) 26 (e.g., as an optional path attribute in an LDP message). Hence, a backup provider edge (rPE) router 16 is an egress provider edge (PE) router that can reach a protected prefix (P/m) 26 via an external neighboring router, e.g., a customer edge router 20.

The provider edge router (PE0) can recognize that it has its own external path to the external network ("Network 1") 24 having the address prefix "10.0.0.0/8" 26 via the customer edge router "CE2 " 20, and can advertise reachability to the address prefix "10.0.0.0/8" 26 via a BGP next hop address "1.1.1.1" 36.

The provider edge router (PE0) 12 also can detect in operation 56 that the next-hop reachable address prefix "10.0.0.0/8" 26 is reachable via another Provider Edge router, namely the backup provider edge router (rPE) "PE1" 16. In response detecting the backup provider edge (rPE) router "PE1" 16 providing reachability to the locally-reachable destination address prefix "10.0.0.0/8" 26, the processor circuit 42 of the pPE 12 can allocate in operation 56 at least one protected next hop address (pNH) (e.g., pNH=1.1.1.2) 28. In one embodiment, the processor circuit 42 of the pPE 12 can allocate only one pNH 28 for the entire router 12; in another embodiment, the processor circuit 42 can allocate a corresponding pNH 28 for all prefixes 26 protected by the same backup provider edge (rPE) router 16.

The processor circuit 42 of the pPE 12 can send in operation 58, via the core network 22, repair information for the prescribed destination address prefix "10.0.0.0/8" 26 to at least one ingress provider edge router (e.g., PE 11) 14 and a Border Gateway Protocol (BGP)-free core network router (rP) 18 in the core network 22, described in further detail below. In one embodiment, the BGP-free core network router (rP) 18 can be the penultimate hop router for the pPE router 12; in other embodiments, the rP router 18 can be another router in the core network 22. The repair information enables the ingress provider edge routers (e.g., PE11 and/or PE22) 14 to insert (i.e., "push") primary and backup switching labels into each data packet of the core network traffic.

The repair information also enables the rP router 18 in operation 60 to choose the backup path 34 if the primary path 32 is unavailable, based on the primary and backup switching labels and locally-stored repair information, described below. Hence, the repair information enables the rP router 18 to interpret the primary and backup switching labels, enabling the BGP-free core network router 18 in operation 60 to reroute the received data packet to the backup provider edge router (e.g., PE1) 16 if the provider edge router PE0 12 is unavailable (e.g., based on popping and/or swapping the primary and backup switching labels, described below).

Figure 4:
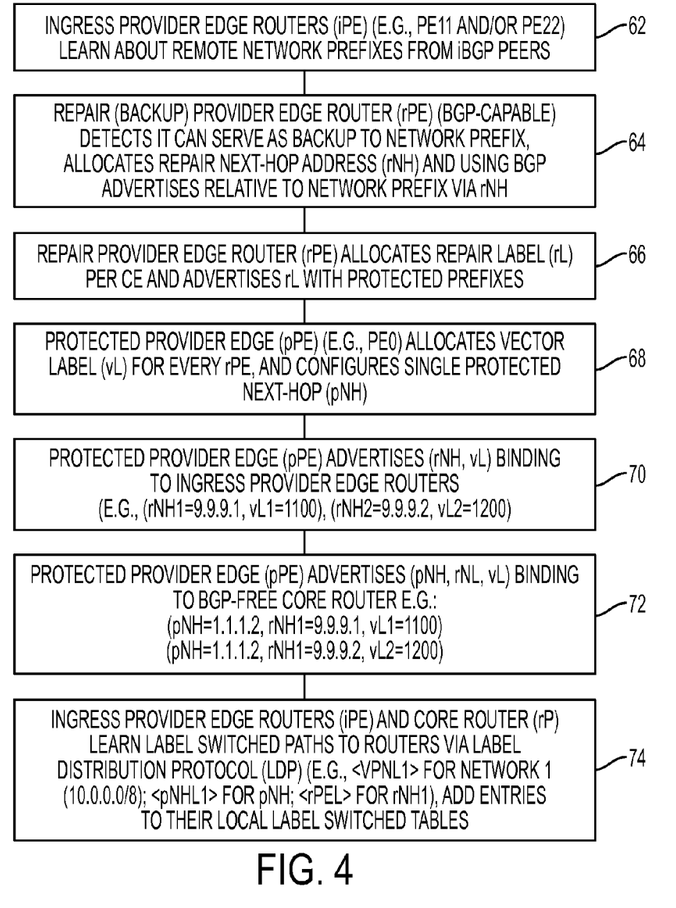
FIG. 4 illustrates an example method of an apparatus sending repair information to enable edge router insertion of primary and backup switching labels into each data packet for rerouting by the BGP-free core router, according to an example embodiment.

FIG. 4 illustrates an example method of the protected Provider Edge (pPE) router 12 sending repair information to enable edge router insertion of primary and backup switching labels into each data packet for rerouting by the BGP-free core router, according to an example embodiment. As described below, the processor circuit 42 of the protected Provider Edge (pPE) router 12 can be configured for generating a vector label (vL) (82 of FIG. 5) for every backup provider edge (rPE) router 16, and sending repair information to the ingress PE routers 14 and the repairing core router (rP) 18 based on the vector label 82.

As described previously, the ingress provider edge routers 14 in operation 62 can learn about the remote network prefixes 26 via their BGP peers 12 and 16. For example, the iPE routers "PE11" and "PE12" 14 can learn in operation 62 that the destination address prefix "10.0.0.0/8" 26 is reachable via router "PE0" (e.g., via the BGP next hop address 36) or "PE1", and that the destination address prefix "20.0.0.0/8" is reachable via router "PE0" or "PE2".

The BGP-capable routers "PE1" and "PE2" can determine in operation 64 that they can serve as backup routers to the router "PE0" for the destination network prefixes "10.0.0.0/8" 26 and "20.0.0.0/8", respectively. Hence, the routers "PE1" and "PE2" can configure themselves as backup provider edge (rPE) routers 16 based on allocating a repair Next-Hop address (rNH) 30, and advertising the available rNH address 30 for the respective destination network prefixes 26. For example, the rPE "PE1" 16 can advertise prefix "10.0.0.0/8" 26 is reachable via the repair next hop address "rNH1=9.9.9.1" 30, and the rPE "PE2" can advertise that the prefix "20.0.0.0/8" 26 is reachable via the repair next hop address "rNH2=9.9.9.2" 30.

Each repair PE router (rPE) 16 also can allocate in operation 66 a repair label (rL) (84 in FIG. 5) that can be a 20-bit standard MPLS label. The repair label (rL) 84, generated by the rPE 16 for each corresponding customer edge router (e.g., CE1) 20, is a pointer into a local label table entry in the corresponding repair PE router (rPE) that identifies the next-hop customer edge router (e.g., "CE1 ") 20 for the associated destination address prefix 26. For example, the repair PE router (rPE) "PE1" 16 can generate a repair label "rL1=3100" that points to a table entry in PE1 identifying the next hop router "CE1 " 20 for the destination address prefix "10.0.0.0/8" 26; the repair PE router "PE2" also can generate a corresponding repair label (rL) 84 for the address prefix "20.0.0.0/8" reachable via the customer edge router "CE4" 20. Each repair PE router (rPE) 16 in operation 66 can advertise the generated repair label (rL) 84 with the protected prefixes 26 (e.g., PE1 advertises "rL=3100" for "10.0.0.0/8"). Although not described in detail herein, similar operations are performed by the rPE router "PE2" 16 with respect to the prefix "20.0.0.0/8" 26. Note that the repair label (rL) 84 and protected prefixes 26 need not necessarily be advertised by the repair PE router (rPE) 16, as other means are possible for providing the repair label-prefix association to the other provider edge routers.

The protected PE (pPE) router 12 in operation 68 can allocate a corresponding vector label (vL) 82 for every repair PE (rPE) router 16 (e.g., "vL1=1100" for PE1; "vL2=1200" for PE2), and can configure a single protected next-hop address (e.g., pNH=1.1.1.2) 36 for the entire router "PE0" and that is distinct from the normal BGP next hop address 36.

Hence, the protected PE (pPE) router 12 can send repair information that enables the ingress PEs (iPEs) 14 to insert switching labels. In particular, the pPE router 12 in operation 70 can send to the ingress PE routers 14 an advertisement message that associates the vector label (vL) 82 with the repair next-hop address (rNH) 30, for example in the form of a repair next-hop address-vector label (rNH, vL) binding (e.g., rNH1=9.9.9.1; vL1=1100). The protected PE (pPE) router 12 also can send to the BGP-free core network router (rP) 18 in operation 72 an advertisement message that associates the protected next hop address (pNH) 28, the repair next-hop address (rNH) 30, and the vector label (vL) 82 (e.g., pNH=1.1.1.2, rNH1=9.9.9.1, vL1=1100).

The ingress provider edge (iPE) routers 14 and the core router (rP) 18 in operation 72 also can learn the appropriate label switched paths for reaching the protected next hop (pNH) address 28 and the repair next hop (rNH) address 30, and add the appropriate entries into their local label tables. For example, the protected PE (pPE) router 12 can advertise the mapping (pNHL1, pNH) that specifies that the label "pNHL1" (86 of FIG. 5) is used to reach the protected next hop address "pNH=1.1.1.2" 28; the pPE router 12 also can advertise the mapping (VPNL1, 10.0.0.0/8) that specifies a layer 3 service label "VPNL1" (88 of FIG. 5) is used to reach the address prefix "10.0.0.0/8" 26 via the protected PE (pPE) router PE0 12. An example layer 3 service label is a VPN label as used in Layer 3 Virtual Private Networks (L3VPN), although other types of layer 3 service labels can be used.

Hence, the ingress PE (iPE) routers 14 can build tables that specify primary and backup labels for insertion into each data packet, enabling the BGP-free core network router to reroute the received data packet to the repairing PE (rPE) router "PE1" if the protected PE (pPE) router 12 is not available. More specifically, each iPE router can choose according to its own policies what path should be used as a primary path, and what path should be used as a secondary (backup) path. Assuming with respect to FIG. 1 that the iPE router 14 chooses the protected PE (pPE) router "PE0" as the primary path 32 for reaching the destination address prefix "10.0.0.0/8" 26 and the router "PE1" as the repair PE (rPE) router 16 for the backup path 34 for reaching the destination address prefix "10.0.0.0/8" 26, the iPE router can create a local label table entry specifying that for the destination prefix "10.0.0.0/8" 26, the iPE 14 should push the following labels into any received data packet in the following order, as illustrated for the data packet 98 in FIG. 5: <VPNL1>88, <rL=3100>84, <vL1=1100>82, and <pNHL1>86 (as a transport label for reaching the primary next hop address pNH 28).

The repairing core router (rP) 18 in operation 74 also can add a table entry into a context-sensitive table for the router PE0 12 specifying that: if pPE 12 is reachable, then pop three (3) labels and forward to pPE 12 as the next hop; if pPE 12 is not reachable, then pop the label pNHL1 86, use the vector label "vL1=1100" 82 as an index into the context-sensitive table for router PE0 12 to locate a corresponding label "rNHL1" (92 in FIG. 5) for reaching the repair PE router "PE1" 16, and swap the vector label 82 with the repair next hop label "rNHL1" 92 to forward the data packet (114 of FIG. 5) along the backup path 34 to the repair PE router (rPE) "PE1" 16. For link-state interior gateway protocols (IGPs), "pNH" can be advertised by the repairing core router (rP) 18 with a "maximum metric" so as not to affect the path taken by the data traffic flowing from the iPEs 14 to the pPE 12.

Although not described in detail herein, similar operations can be executed for implementing labels in the iPEs 14 and the rP 18 for establishing the primary and backup paths for reaching the destination address prefix "20.0.0.0/8".

Figure 5:
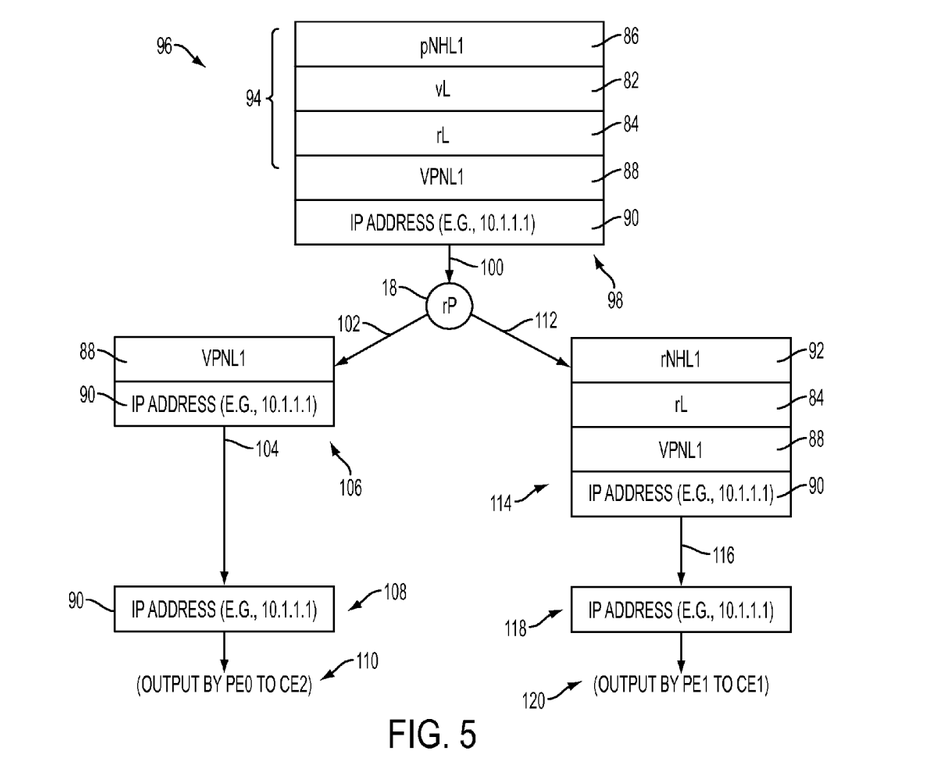
FIG. 5 illustrates example switching labels inserted into a data packet during transmission via the core network of FIG. 1, according to an example embodiment.

FIG. 5 illustrates example switching labels inserted into a data packet during transmission via the core network of FIG. 1, according to an example embodiment. Assuming the ingress PE (iPE) router "PE11" receives a data packet from the customer edge router "CE11" 20 and specifying a destination IP address 90 of "10.1.1.1", the ingress PE 14 can access its internal label table as described above and insert ("push") the primary and backup switching labels 94 overlying the layer 3 service label "VPNL1" 88 for reaching the destination address prefix "10.0.0.0/8" 26 (operation 96). The ingress PE (iPE) router "PE11" can output the packet 98 in operation 100 into the core network 22, causing the repairing core router (rP) 18 to receive the data packet 98. The repairing core router (rP) 18 can be implemented as a penultimate hop router having a data link connected to the protected PE (pPE) router "PE0" 12; optionally, the repairing core router (rP) 18 can be multiple hops from the protected PE (pPE) router "PE0" 12. If the repairing core router (rP) 18 determines the protected PE (pPE) router "PE0" 12 is available, the repairing core router (rP) 18 in operation 102 can remove (i.e., "pop") the top three labels, namely "pNHL1" 86, the vector label (vL) 82, and the repair label (rL) 84. Hence, the repairing core router (rP) 18 in operation 104 can output the modified packet 106 to the protected PE (pPE) router 12, which can "pop" the layer 3 service label 88 and use the layer 3 service label 88 as an index into a local label table that specifies the next hop for the incoming label "VPNL1" is the customer edge router "CE2" 20. Hence, the protected PE (pPE) router "PE0" 12 can output the modified packet 108 in operation 110 to the customer edge router "CE2" 20 for delivery to the destination network "Network 1" 24.

If the repairing core router (rP) 18 determines the protected PE (pPE) router "PE0" 12 is not available, the repairing core router (rP) 18 in operation 112 can "pop" the "pNHL1" label 86 and use the vector label ("vL1=1100") 82 as an index to locate the corresponding repair next hop label "rNHL1" 92 associated with the vector label 82 in the context-specific label table for the protected PE (pPE) router "PE0" 12. As illustrated in FIG. 5, the repairing core router (rP) 18 can swap the vector label 82 with the repair next hop label "rNHL1" 92 for reaching the repair next hop address "rNH1=9.9.9.1" 30, and output in operation 116 the modified data packet 114 for delivery to the repair next hop (rPE) router 16 via the core network 22.

Assuming the repairing PE router (rPE) "PE1" 16 receives the data packet 114 (minus the label "rNHL1" 92 that was popped by its penultimate hop router in the core network 22) (i.e., penultimate hop popping), the repairing PE (rPE) router "PEP1" 16 can determine from its repair label (rL) 84 (e.g., "rL1=3100") that the corresponding table entry in PE1 associated with the repair label "rL1=3100" specifies to pop two labels 84 and 88, and identifies the next hop router "CE1" 20 for the destination address prefix "10.0.0.0/8" 26. Hence, the repairing PE router "PE1" 16 can output the modified packet 118 in operation 120 to the customer edge router "CE1" 20 for delivery to the network "Network 1" 24.

According to the example embodiment described with respect to FIGS. 1-5, the protected PE (pPE) router 12 allocates a locally unique vector label (vL) 82 per candidate rPE 16. The repairing core router (rP) 18 can store and "look up" the vector label (vL) 82 within a label context corresponding to the pPE 12 (e.g., within a local table designated for only the pPE 12), enabling the rP 18 to correctly reroute a data packet onto an alternate (backup) path 34 based on a determined unavailability of the pPE 12. The ingress PE (iPE) 14 pushes four labels (88, 84, 82, and 86 of FIG. 5) overlying the layer 3 service label 88 and the destination IP address 90, ensuring that the primary and backup switching labels 94 are encoded into each data packet. Hence, the processor circuit 42 of the repairing core router (rP) 18 can pop three labels 86, 82, and 84 if the primary PE (pPE) router "PE0" 12 is available, and otherwise pop the label 86, and swap the vector label (vL) 82 with the repair next hop label (rNHL1) 92 in response to a determined absence of the primary PE (pPE) router "PE0" 12. Since the repair label (rL) 84 is allocated by the repairing PE (rPE) router "PE1" 16, the repairing PE (rPE) router "PE1" 16 can forward the repaired traffic correctly by popping two labels 84 and 88, and forwarding the modified packet 118 to the correct customer edge router "CE1" 20.

Figure 6:
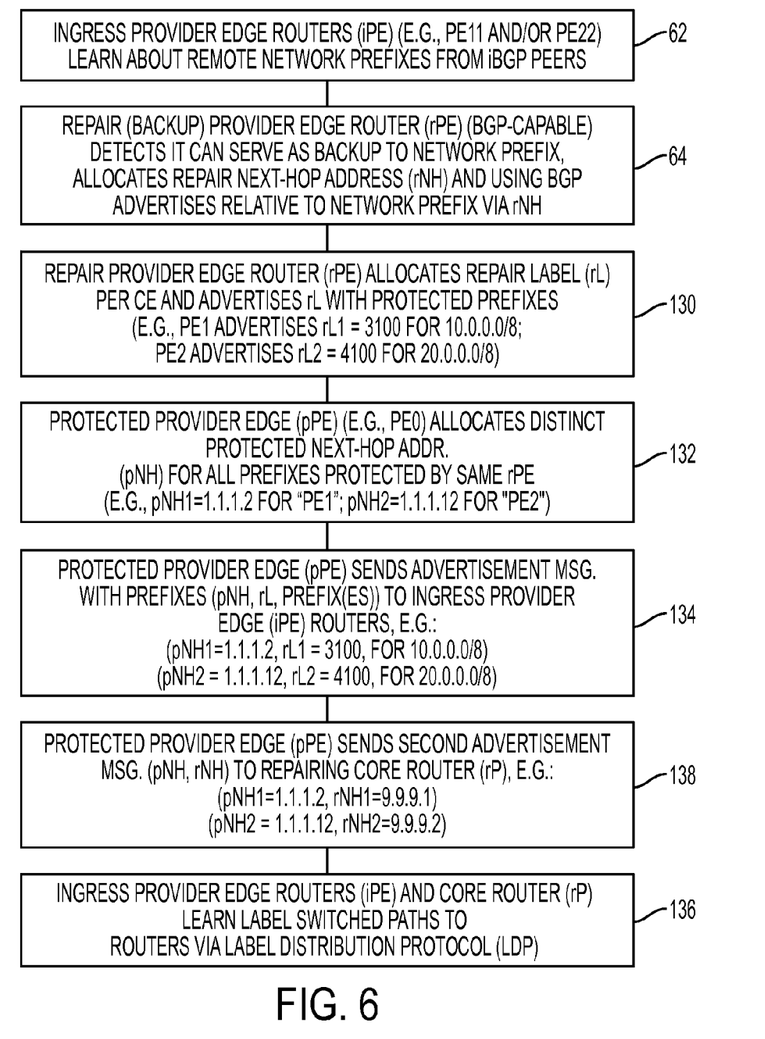
FIG. 6 illustrates another example method of an apparatus sending repair information to enable edge router insertion of primary and backup switching labels into each data packet for rerouting by the BGP-free core router, according to a second example embodiment.
Figure 7:
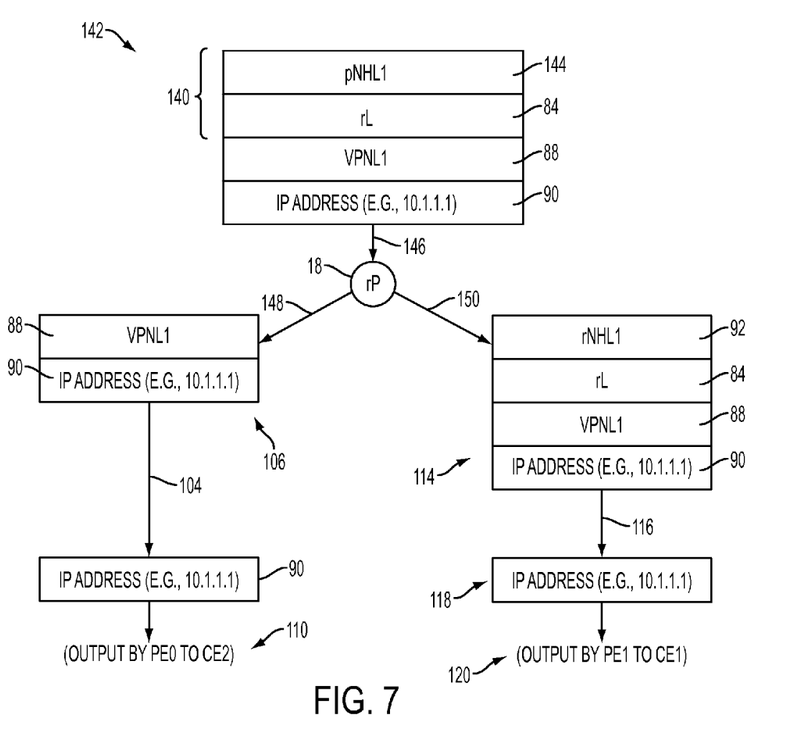
FIG. 7 illustrates another example of switching labels inserted into a data packet during transmission via the core network of FIG. 1, according to the second example embodiment.

FIGS. 6 and 7 illustrate the processor circuit 42 of a protected PE (pPE) router "PE0" sending repair information to the iPE routers 14 and the repairing core router (rP) 18 to enable insertion of primary and backup switching labels into data packets for rerouting by the repairing core router (rP) 18, according to a second example embodiment.

FIG. 6 illustrates another example method of an apparatus sending repair information to enable edge router insertion of primary and backup switching labels into each data packet for rerouting by the BGP-free core router, according to a second example embodiment. FIG. 7 illustrates another example of switching labels inserted into a data packet during transmission via the core network of FIG. 1, according to the second example embodiment.

As described previously with respect to FIG. 4, the edge routers 12, 14, and 16 can learn about the remote network prefixes 26 via their BGP peers in operation 62, and the backup provider edge routers (rPE) 16 can allocate repair next hop addresses (rNH) 30 on a per customer edge router (CE) basis. Hence, the repairing PE (rPE) router "PE1" 16 can allocate the repair next hop address "rNH1=9.9.9.1" 30 for the customer edge router "CE1" 20 providing reachability to the destination address prefix "10.0.0.0/8" 26, and the repairing PE (rPE) router "PE2" 16 can allocate the repair next hop address ""rNH2=9.9.9.2" 30 for the customer edge router "CE4" 20 providing reachability to the destination address prefix "2.0.0.0/8" 26.

In operation 130 of FIG. 6 the processor circuit 42 of each backup provider edge router (rPE) 16 can allocate a repair label (rL) 84 on a per customer edge (CE) router basis, create an internal table entry using the repair label as an index for reaching the destination address prefix 26 via the corresponding customer edge router 20, and advertise the repair label (rL) 84 with the particular prefixes. For example, the backup provider edge router (rPE) "PEP" 16 can advertise the repair label "rL1=3100" 84 is associated with the address prefix "10.0.0.0/8" 26, and the backup provider edge router (rPE) 16 "PE2" can advertise the repair label "rL2=4100" 84 is associated with the address prefix "20.0.0.0/8" 26.

The protected Provider Edge (pPE) router "PE0" 12 allocates in operation 132 a distinct protected next hop address (pNH) 28 for all protected prefixes 26 that are protected by the same backup provider edge router (rPE) 16. For example, the protected provider edge (pPE) router "PE0" 12 can allocate "pNH1=1.1.1.2" 28 for "PE1" 16, and "pNH2=1.1.1.12" 28 for "PE2" 16.

The protected Provider Edge (pPE) router "PE0" 12 in operation 134 sends an advertisement message to the ingress Provider Edge (iPE) routers 14 that associates the protected next hop address 28, the repair next hop address 30, and the protected prefix 26, for example "(pNH1=1.1.1.2, rL1=3100, 10.0.0.0/8)" and "(pNH2=1.1.1.12, rL2=4100, 20.0.0.0/8)". Hence, each ingress Provider Edge (iPE) router 14 can create a table entry specifying that a prescribed destination address prefix (e.g., "10.0.0.0/8") 26 is reachable via a protected next hop address (e.g., "pNH1=1.1.1.2") 28 using the associated repair label (e.g., "rL1=3100"). Similar to operation 74 of FIG. 4, each ingress Provider Edge (iPE) router 14 can add the appropriate labels to its label table for pushing the primary and backup switching labels (140 of FIG. 7) into each data packet (142 of FIG. 7), including the label "pNHL1" (144 of FIG. 7) for the protected next hop address "pNH1" allocated by the protected PE router "PE0" for all prefixes protected by the corresponding repairing PE (rPE) (e.g., "PE1") 16. As illustrated in FIG. 7, each ingress PE (iPE) can push the primary and backup switching labels 140 overlying the layer 3 service label 88, where in this second embodiment the primary and backup switching labels 140 can include the repair label 84 and the protected next hop label 144 associated with the protected next hop address "pNH1" 28. The ingress PE (iPE) router 14 can output the data packet 142 in operation 146 for delivery to the repairing core router (rP) 18 via the core network 22.

The protected Provider Edge (pPE) router "PE0" 12 in operation 138 sends a second advertisement to the repairing core router (rP) 18 that advertises the association between the protected next hop address (pNH) 28 and the repair next hop address (rNH) 30, for example "(pNH1=1.1.1.2, rNH1=9.9.9.1)" for the protected prefix "10.0.0.0/8" 26, and "(pNH2=1.1.1.12, rNH2=9.9.9.2)" for the protected prefix "20.0.0.0" 26. Hence, as illustrated in FIG. 7, the repairing core router (rP) 18 can create a local table entry that specifies that if in operation 148 the protection next hop address (e.g., pNH1=1.1.1.2) 28 is reachable, the repairing core router (rP) 18 can pop the two labels 144 and 84, and output the modified data packet 106 in operation 104 for delivery to the protected PE (pPE) router 12 as described previously with respect to FIG. 5. The repairing core router (rP) 18 also can create a local table entry based on the advertisement received from the protected PE (pPE) router 12 in operation 138: the local table entry can specify that if in operation 150 the protected PE (pPE) router 12 is not available, the repairing core router (rP) 18 can swap the top label "pNHL1" (used for reaching the protected next hop address "pNH1" 28) with the label "rNHL1" 92 for reaching the repair next hop "rNH1" address 30. The repairing core router (rP) 18 can output the modified data packet 114 for delivery to the repairing PE (rPE) router "PEP1" 16 as described previously with respect to FIG. 5.

As apparent from the foregoing, the repairing core router (rP) 18 also can create a second local table entry that specifies that if the protected PE (pPE) router 12 is not available to deliver to the customer edge router "CE3" 20 a data packet destined for the network "Network 2" having the destination prefix "20.0.0.0/8" 26, the repairing core router (rP) 18 can swap the label "pNHL2" (used to reach the protected next hop "1.1.1.2") with a corresponding label "rNHL2" for the repair Next Hop (rNH) address "rNH2=9.9.9.2" 30 for delivery of the data packet to the destination network "Network 2" 24 via the second repair Next Hop (rNH) router "PE2".

According to the second example embodiment, the protected PE (pPE) router 12 can allocate a globally distinct protected next hop (pNH) address 28 per protected next hop-repair next hop (pPE-rPE) pair. Hence, since every protected next hop (pNH) address 28 corresponds to a distinct repair next-hop address (rNH) 30, the repairing core router (rP) 18 can reroute traffic to the correct repair Protected Egress (rPE) 16 if the protected PE (pPE) router 12 fails.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
  detecting, by a provider edge router configured for providing reachability for core network traffic to a prescribed destination address prefix, a backup provider edge router relative to the prescribed destination address prefix;
  allocating, by the provider edge router, a distinct protected next-hop address for reachability to at least the destination address prefix via the provider edge router; and
  sending via a core network, by the provider edge router, repair information for the prescribed destination address prefix to at least one ingress provider edge router and a Border Gateway Protocol (BGP)-free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

2. The method of claim 1, wherein:
  the allocating includes allocating the protected next-hop address as a single next-hop address for all protected address prefixes served by the provider edge router, the protected address prefixes including the destination address prefix;
  the method further comprises allocating a vector label for the backup provider edge router; and
  the sending includes sending, as at least a part of the repair information, a first advertisement associating together the protected next-hop address, the vector label, and a repair next-hop address used to reach the backup provider edge router.

3. The method of claim 2, wherein the first advertisement enables at least the BGP-free core network router to associate the backup provider edge router as an alternative to the provider edge router in response to detecting the vector label in one of the data packets.

4. The method of claim 2, wherein the sending includes sending, as part of the repair information, a second advertisement associating the vector label with the repair next-hop address to the ingress provider edge router.

5. The method of claim 4, wherein the second advertisement enables the ingress provider edge router to insert into each data packet, as part of the primary and backup switching labels overlying a layer 3 service label for reaching the prescribed destination address prefix, a repair label used by the repairing edge router for reaching the prescribed destination address prefix, the vector label, and a label for reaching the protected next-hop address.

6. The method of claim 5, wherein:
the first advertisement enables the BGP-free core network router to send, to the provider edge router if available, the received data packet as a first modified data packet, based on the BGP-free core network router popping from the received data packet the label for reaching the protected next-hop address, the vector label, and the repair label and the BGP-free core network router forwarding the first modified data packet via the core network based on the layer 3 service label;
if the provider edge router is available, the method further comprising the provider edge router selectively receiving, from the BGP-free core network router, the first modified data packet based on the layer 3 service label, outputting the first modified data packet as a second modified data packet based on popping the layer 3 service label overlying a destination address within the prescribed destination address prefix, and forwarding the second modified data packet to a consumer edge router providing reachability to the prescribed destination address prefix;
the first advertisement enables the BGP-free core network router to create a table entry relative to the protected next-hop address that associates the vector label to the repair next-hop address, enabling the BGP-free core network router to send a third modified data packet if the provider edge router is not available based on:
popping the label for reaching the protected next-hop address from the received data packet,
replacing the vector label in the received data packet with a label for reaching the repair next hop address, and
sending the third modified data packet, containing the label for reaching the repair next hop address, the repair label, the layer 3 service label, and the destination address, to the backup provider edge router for delivery to the prescribed destination address prefix.

7. The method of claim 1, wherein:
the allocating includes allocating the protected next-hop address for all destination address prefixes, including the prescribed destination address prefix, that are served by the backup provider edge router;
the sending includes sending to the BGP-free core network router, as at least a part of the repair information, a first advertisement associating the protected next-hop address with a repair next-hop address used to reach the backup provider edge router;
the sending further including sending to the ingress provider edge router, as part of the repair information, a second advertisement associating together the prescribed destination address prefix, a repair label used by the repairing edge router for reaching the prescribed destination address prefix, and the protected next-hop address.

8. The method of claim 7, wherein the second advertisement enables the ingress provider edge router to insert into each data packet, as part of the primary and backup switching labels overlying a layer 3 service label for reaching the prescribed destination address prefix, the repair label, and a label for reaching the protected next-hop address.

9. The method of claim 8, wherein:
the first advertisement enables the BGP-free core network router to send, to the provider edge router if available, the received data packet as a first modified data packet based on the BGP-free core network router popping from the received data packet the label for reaching the protected next-hop address and the repair label, and the BGP-free core network router forwarding the first modified data packet via the core network based on the layer 3 service label;
if the provider edge router is available, the method further comprising the provider edge router selectively receiving, from the BGP-free core network router, the first modified data packet based on the layer 3 service label, outputting the first modified data packet as a second modified data packet based on popping the layer 3 service label overlying a destination address within the prescribed destination address prefix, and forwarding the second modified data packet to a consumer edge router providing reachability to the prescribed destination address prefix.

10. The method of claim 8, wherein if the provider edge router is not available, the first advertisement enables the BGP-free core network router to create a table entry that associates the protected next-hop address with the repair next-hop address, enabling the BGP-free core network router to send a first modified data packet based on:
replacing the label for reaching the protected next-hop address from the received data packet with a label for reaching the repair next hop address, and
sending the first modified data packet, containing the label for reaching the repair next hop address, the repair label, the layer 3 service label, and the destination address, to the backup provider edge router for delivery to the prescribed destination address prefix.

11. Logic encoded in one or more non-transitory tangible media for execution by a machine and when executed operable for:
detecting, by the machine implemented as a provider edge router and configured for providing reachability for core network traffic to a prescribed destination address prefix, a backup provider edge router relative to the prescribed destination address prefix;
allocating, by the provider edge router, a distinct protected next-hop address for reachability to at least the destination address prefix via the provider edge router; and
sending via a core network, by the provider edge router, repair information for the prescribed destination address prefix to at least one ingress provider edge router and a Border Gateway Protocol (BGP)-free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

12. The logic of claim 11, wherein the allocating includes allocating the protected next-hop address as a single next-hop address for all protected address prefixes served by the provider edge router, the protected address prefixes including the destination address prefix;
the logic further operable for allocating a vector label for the backup provider edge router; and
the sending includes sending, as at least a part of the repair information, a first advertisement associating together the protected next-hop address, the vector label, and a repair next-hop address used to reach the backup provider edge router.

13. The logic of claim 12, wherein the first advertisement enables at least the BGP-free core network router to associate the backup provider edge router as an alternative to the provider edge router in response to detecting the vector label in one of the data packets.

14. The logic of claim 12, wherein the sending includes sending, as part of the repair information, a second advertisement associating the vector label with the repair next-hop address to the ingress provider edge router.

15. The logic of claim 14, wherein the second advertisement enables the ingress provider edge router to insert into each data packet, as part of the primary and backup switching labels overlying a layer 3 service label for reaching the prescribed destination address prefix, a repair label used by the repairing edge router for reaching the prescribed destination address prefix, the vector label, and a label for reaching the protected next-hop address.

16. The logic of claim 15, wherein:
the first advertisement enables the BGP-free core network router to send, to the provider edge router if available, the received data packet as a first modified data packet, based on the BGP-free core network router popping from the received data packet the label for reaching the protected next-hop address, the vector label, and the repair label and the BGP-free core network router forwarding the first modified data packet via the core network based on the layer 3 service label;
if the provider edge router is available, the logic further operable for the provider edge router selectively receiving, from the BGP-free core network router, the first modified data packet based on the layer 3 service label, outputting the first modified data packet as a second modified data packet based on popping the layer 3 service label overlying a destination address within the prescribed destination address prefix, and forwarding the second modified data packet to a consumer edge router providing reachability to the prescribed destination address prefix;
the first advertisement enables the BGP-free core network router to create a table entry relative to the protected next-hop address that associates the vector label to the repair next-hop address, enabling the BGP-free core network router to send a third modified data packet if the provider edge router is not available based on:
popping the label for reaching the protected next-hop address from the received data packet,
replacing the vector label in the received data packet with a label for reaching the repair next hop address, and
sending the third modified data packet, containing the label for reaching the repair next hop address, the repair label, the layer 3 service label, and the destination address, to the backup provider edge router for delivery to the prescribed destination address prefix.

17. The logic of claim 11, wherein:
the allocating includes allocating the protected next-hop address for all destination address prefixes, including the prescribed destination address prefix, that are served by the backup provider edge router;
the sending includes sending to the BGP-free core network router, as at least a part of the repair information, a first advertisement associating the protected next-hop address with a repair next-hop address used to reach the backup provider edge router;
the sending further including sending to the ingress provider edge router, as part of the repair information, a second advertisement associating together the prescribed destination address prefix, a repair label used by the repairing edge router for reaching the prescribed destination address prefix, and the protected next-hop address.

18. The logic of claim 17, wherein the second advertisement enables the ingress provider edge router to insert into each data packet, as part of the primary and backup switching labels overlying a layer 3 service label for reaching the prescribed destination address prefix, the repair label, and a label for reaching the protected next-hop address.

19. The logic of claim 18, wherein if the provider edge router is not available, the first advertisement enables the BGP-free core network router to create a table entry that associates the protected next-hop address with the repair next-hop address, enabling the BGP-free core network router to send a first modified data packet based on:
replacing the label for reaching the protected next-hop address from the received data packet with a label for reaching the repair next hop address, and
sending the first modified data packet, containing the label for reaching the repair next hop address, the repair label, the layer 3 service label, and the destination address, to the backup provider edge router for delivery to the prescribed destination address prefix.

20. An apparatus comprising:
a network interface circuit configured for detecting a backup provider edge router, the apparatus implemented as a provider edge router configured for providing reachability for core network traffic to a prescribed destination address prefix, the backup provider edge router relative to the prescribed destination address prefix; and
a processor circuit configured for allocating a distinct protected next-hop address for reachability to at least the destination address prefix via the provider edge router;
the processor circuit configured for generating, for transmission, via a core network, repair information for the prescribed destination address prefix to at least one ingress provider edge router and a Border Gateway Protocol (BGP)-free core network router in the core network, the repair information enabling the ingress provider edge router to insert primary and backup switching labels into each data packet of the core network traffic enabling the BGP-free core network router to reroute the received data packet to the backup provider edge router if the provider edge router is unavailable.

* * * * *